United States Patent
Ikeda et al.

(10) Patent No.: US 7,173,782 B2
(45) Date of Patent: Feb. 6, 2007

(54) MAGNETIC DISK DRIVE AND REFRESH METHOD

(75) Inventors: Masaomi Ikeda, Kanagawa (JP); Atsushi Tobari, Kanagawa (JP); Takao Matusi, Kanagawa (JP); Satoshi Hashimoto, Kanagawa (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 11/084,770

(22) Filed: Mar. 17, 2005

(65) Prior Publication Data
US 2005/0207049 A1    Sep. 22, 2005

(30) Foreign Application Priority Data
Mar. 17, 2004    (JP)    ............................. 2004-075642

(51) Int. Cl.
*G11B 27/36* (2006.01)
(52) U.S. Cl. ...................................................... 360/31
(58) Field of Classification Search .................. 360/31, 360/75, 69, 23, 51, 53, 97.02, 137; 711/112; 714/6; 386/75
See application file for complete search history.

(56) References Cited

U.S. PATENT DOCUMENTS 4,914,527 A * 4/1990 Asai et al. ..................... 386/75
5,729,397 A * 3/1998 Ottesen et al. ................. 360/69
5,889,934 A * 3/1999 Peterson .......................... 714/6
6,412,042 B1 * 6/2002 Paterson et al. ............. 711/112
6,809,893 B2 * 10/2004 Uzumaki et al. .............. 360/31

FOREIGN PATENT DOCUMENTS

| JP | 04-248164 | 9/1992 |
| JP | 07-272471 | 10/1995 |
| JP | 2000-187926 | 7/2000 |

* cited by examiner

*Primary Examiner*—Fred F. Tzeng
(74) *Attorney, Agent, or Firm*—Townsend and Townsend and Crew LLP

(57) ABSTRACT

Embodiments of the invention provide a magnetic disk drive that does not generate errors when information is read even if considerable time has elapsed after the information was written on the magnetic disk. In one embodiment, a magnetic disk has a storage area divided into a plurality of sectors ST1. Time stamps TP1 corresponding to each sector data m1 stored in the sectors ST1 are stored in a time stamp recording medium. A processor controls the magnetic disk drive to read time stamps TP2 of sector data m2 stored in any sectors ST2 of the sectors ST1 and refresh sector data m3 selected based on an elapsed time calculated from information about the time when the time stamps are read and the time stamps TP2.

20 Claims, 7 Drawing Sheets

Grain  Magnetization trans  Magnetization trans (A)

| File name | Extension | Attribute | Reserved area | Write date | Starting cluster | File size |
|---|---|---|---|---|---|---|
| ABC | c | | | 2001.10.15 21:41:30 | 5 | 1240 |
| DEF | r | | | 2004.2.29 17:00:00 | 25 | 3640 |
| | | | | | | |

MAGNETIC DISK DRIVE AND REFRESH METHOD

CROSS-REFERENCES TO RELATED APPLICATIONS

This application claims priority from Japanese Patent Application No. JP2004-075642, filed Mar. 17, 2004, the entire disclosure of which is incorporated herein by reference.

BACKGROUND OF THE INVENTION

The present invention relates to a technique for preventing information stored on a magnetic disk in a magnetic disk drive from being lost as time elapses after the write.

In a magnetic disk drive, information is recorded by magnetizing magnetic particles of a magnetic disk. However, information stored magnetically on the magnetic disk has a property that it is degraded or lost with time. In the magnetic disk, information is recorded magnetically as bits by virtue of numerous magnetic particles called grains, which are magnetized by a magnetic field of a write head and maintained in a fixed direction as shown in FIG. 1. The grains have a plurality of stable states and are oriented in a specific stable direction by magnetization. However, even once the grains are magnetized in the specific direction by the magnetic field of the magnetic write head, the grains are affected by thermal energy and begin changing the orientation into other stable directions gradually and, in turn, affect adjacent grains so that more and more grains become oriented in the directions different from the initial direction upon the magnetization. As a result, the read signal may be degraded in terms of resolution and gain. This phenomenon is known as thermal decay. Further, as shown in FIG. 1, at magnetization transition regions located in the circumferential direction of tracks, the magnetic particles in one direction are likely to be affected by the magnetic field of the magnetic particles in the other magnetic direction.

Further, as the track density is increased more and more, the magnetic particles may be affected by the magnetic field generated when a write head writes data into adjacent tracks. This phenomenon is called as adjacent track interference. Therefore, if the information written on the magnetic disk is left as it is for decades or more, it may be degraded and may not be able to be read. The noise in SN ratio in the magnetic disk mainly consists of so-called transition noise. If the magnetization transition region crosses the track straightly, the possibility to electrically distinguish the read information from that in adjacent regions is increased but, if large-sized grains are used, the shape of the magnetic transition region tends to deviate from the straight line and cause the transition noise. Therefore, it is desirable to reduce the size of grains in order to improve the SN ratio. However, the small grains are likely to transit to other stable states under the influence of small energy and, therefore, it is susceptible to effects such as the thermal decay and adjacent track interference.

Japanese Patent Laid-Open No. Hei 7-272471 discloses a technique for recording cumulative operation time of each sector on a disk and taking any action when the cumulative operation time reaches a predetermined value. Japanese Patent Laid-Open No. 2000-187926 discloses a technique for prohibiting a recording medium from being written newly, making an alarm, or making a backup according to the degree of estimated degradation by reading information about the date of manufacture of the recording medium and comparing elapsed time after the manufacture with a predetermined level. Japanese Patent Laid-Open No. Hei 04-248164 discloses a technique for measuring the degree of degradation sequentially and stopping write and read operations.

BRIEF SUMMARY OF THE INVENTION

The information written on the magnetic disk degrades with time. In order to improve the SN ratio and increase the recording density further, it is desirable to reduce the size of grains as much as possible. On the other hand, it is required that errors are not generated when the information is read even in the magnetic disk using smaller-sized grains. Thus, it is a feature of the present invention to provide a magnetic disk drive that does not generate errors when information is read even if considerable time has elapsed after the information was written on the magnetic disk. It is a further feature of the present invention to provide a method for refreshing information so that errors are not generated when the information is read even if considerable time has elapsed after the information was written on a magnetic disk.

According to a first aspect of the present invention, there is provided a magnetic disk drive that can communicate with a host computer. The magnetic disk drive comprises a magnetic disk having a storage area divided into a plurality of sectors and a time stamp recording medium for storing time stamps that correspond to each sector data stored in the plurality of sectors. The magnetic disk drive further comprises a processor for controlling components of the magnetic disk drive to read the time stamps of the sector data stored in any of the plurality of sectors and refresh the sector data that is selected based on an elapsed time of the sector data that is calculated from information about the time when the time stamps are read and the read time stamps.

The time stamp recording medium may be a magnetic disk or other nonvolatile recording media. The refresh refers to a procedure to read the data stored in a given sector and, then, write the identical data into the identical sector. The time stamps of sectors are information about the time when the sector data is written into the sectors and are updated simultaneously with the update of the sector data. The information about the time when the sector data is written may include a year when the data is written or a year and month when the data is written. Further, the information may be defined more precisely and include a time, minute and second.

An elapsed time after each sector data has been stored till the time of reading can be calculated by using the information about the time when the sector data is read and the read time stamps. In particular, it can be determined whether the information is degraded due to thermal decay. By comparing the elapsed time of the sector data with a standard elapsed time and selectively refreshing only the sector data exceeding a predetermined elapsed time, the refresh can be performed more effectively and in a shorter time than the case when all the sector data is refreshed.

By reading the time stamps of the sector data stored in the sectors that are addressed to be read by the host computer, the refresh can be performed with the read timing and without waste of extra time for the refresh. At this time, by returning the sector data to the host computer before refreshing the selected sector data, the performance can be prevented from being reduced due to the refresh. By storing the sector data to be refreshed in nonvolatile memory temporarily and refreshing the stored data collectively in a power saving mode or in a power shutdown mode, the refresh can be performed without reduction of the performance even when the host computer instructs to read the sector data successively. Instead of storing the sector data in volatile memory, only the sector addresses of the selected sector data may be stored in nonvolatile memory.

The magnetic disk may be selected as the time stamp recording medium. When the time stamps are recorded on the magnetic disk, a recording area for the time stamps may be provided for each recording surface, each track or each sector. When the recording area for the time stamps is provided for each recording surface, the entire magnetic disk can advantageously be refreshed rapidly without seek time or rotational delay since all the time stamps for the pertinent recording surface can be read from the recording area in a specific range. On the other hand, when the recording area for the time stamps is provided for each sector, the time stamps can be read during the operation to read the sector data. Therefore, the refresh can be performed concurrently with the read of the sector data or read check.

When the recording area for the time stamps is provided for each sector, if the time stamps are incorporated into ECC codes, no extra area is consumed to store the time stamps. By correcting the information about the time when the data is read for an ambient temperature profile of the magnetic disk drive, the timing of degradation of the stored information due to thermal decay can be determined more properly.

According to a second aspect of the present invention, there is provided a magnetic disk drive that can communicate with a host computer. The magnetic disk drive comprises a magnetic disk, a time stamp recording medium, and a processor. The magnetic disk has a storage area divided into a plurality of sectors. The time stamp recording medium stores time stamps that correspond to each sector data stored in the plurality of sectors. The processor controls components of the magnetic disk drive by responding to a refresh command sent from the host computer to read time stamps of sectors specified by the refresh command and to refresh the sector data selected based on an elapsed time of the sector data that is calculated from information about the time when the data is read and the time stamps.

If the refresh is performed for a wide range of the sectors of the magnetic disk, the host computer may not access the magnetic disk drive during the refresh. In this second aspect of the present invention, as the magnetic disk drive can be refreshed according to the refresh command sent from the host computer, the refresh can be performed for all sector data. As it is assured that the information recorded over the entire magnetic disk can be refreshed for a predetermined time period by refreshing all sector data, the SN ratio can be improved by using a magnetic disk having smaller-sized grains.

If the refresh command includes a command to perform read check, the refresh can be included in the read check of the data on the magnetic disk and, as a result, the time stamp check and necessary refresh can be completed substantially within the time period required to complete the read check. As the magnetic disk drive determines the timing to check whether the refresh is needed and sends a refresh request command to the host computer, the host computer can determine the timing to check whether the refresh is needed precisely.

According to a third aspect of the present invention, there is provided a host computer that is connected to a magnetic disk drive that, in turn, comprises a magnetic disk having a storage area divided into a plurality of sectors. The host computer comprises a processor, a file control table and a recording medium. The processor controls operations of the host computer. The file control table holds time stamps stored in each sector in the magnetic disk drive. The recording medium stores a refresh program to allow the processor to perform refresh of sector data selected based on an elapsed time of the sector data that is calculated from the time stamps stored in the file control table and information about the present time.

The time stamps of the sector data are not only stored on the magnetic disk but also held by the file management system of the host computer. Therefore, a burden on the magnetic disk drive can be reduced by performing refresh using the time stamps held by the host computer.

According to the present invention, a magnetic disk drive that does not generate errors when information is read even if considerable time has elapsed after the information was written on the magnetic disk can be provided. Further, a method for refreshing information so that errors are not generated when the information is read even if considerable time has elapsed after the information was written on a magnetic disk can be provided.

BRIEF DESCRIPTION OF THE DRAWINGS

FIG. 7 is a diagram for describing a file control table of the host computer.

DETAILED DESCRIPTION OF THE INVENTION

Block Diagram of a Magnetic Disk Drive

Figure 1:
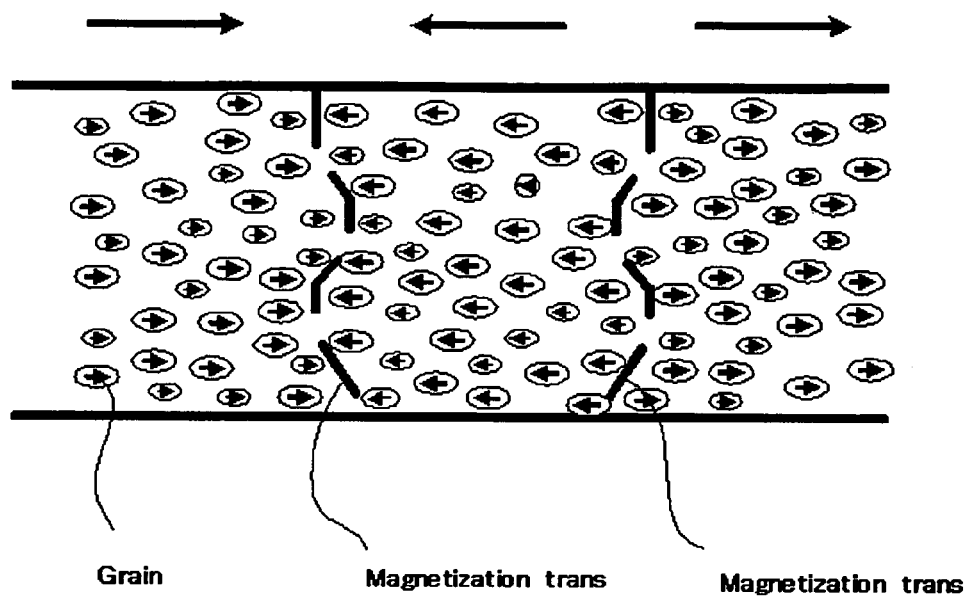
FIG. 1 is a diagram for describing a state in which grains of a magnetic disk, on which information is recorded, make transitions.
Figure 2:
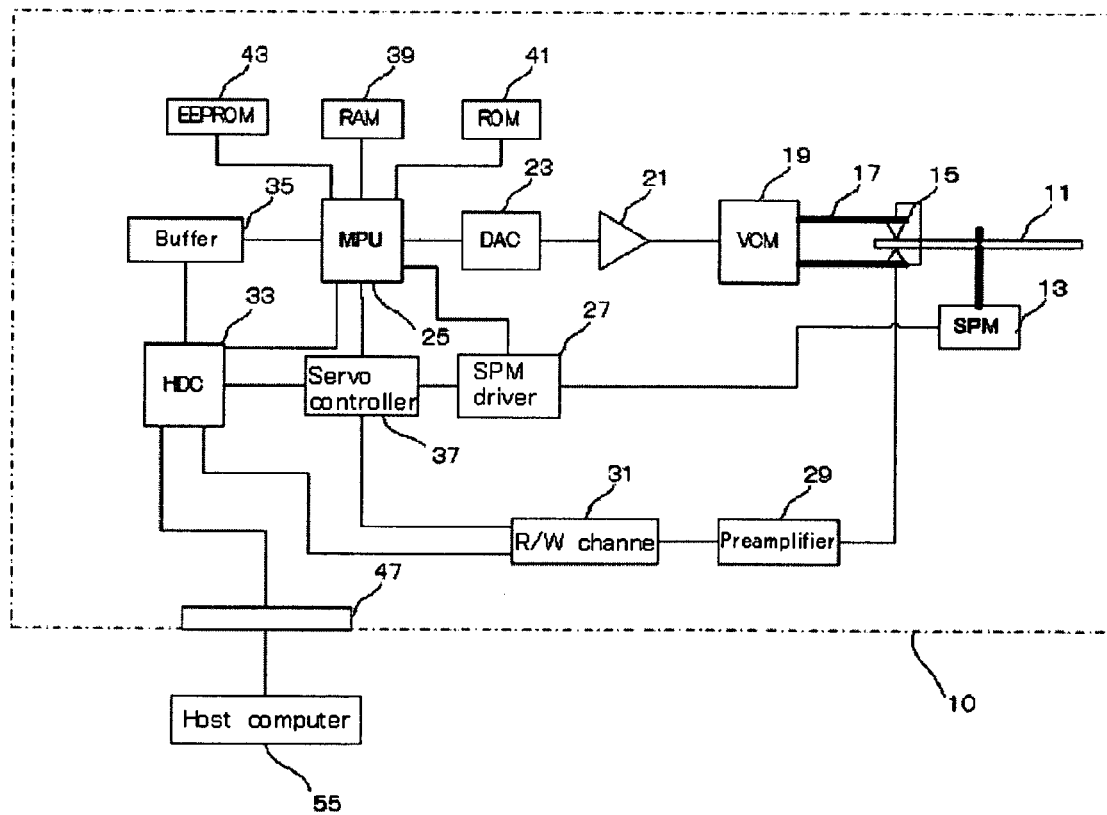
FIG. 2 is a block diagram for describing components of a magnetic disk drive according to an embodiment of the present invention.
Figure 3:
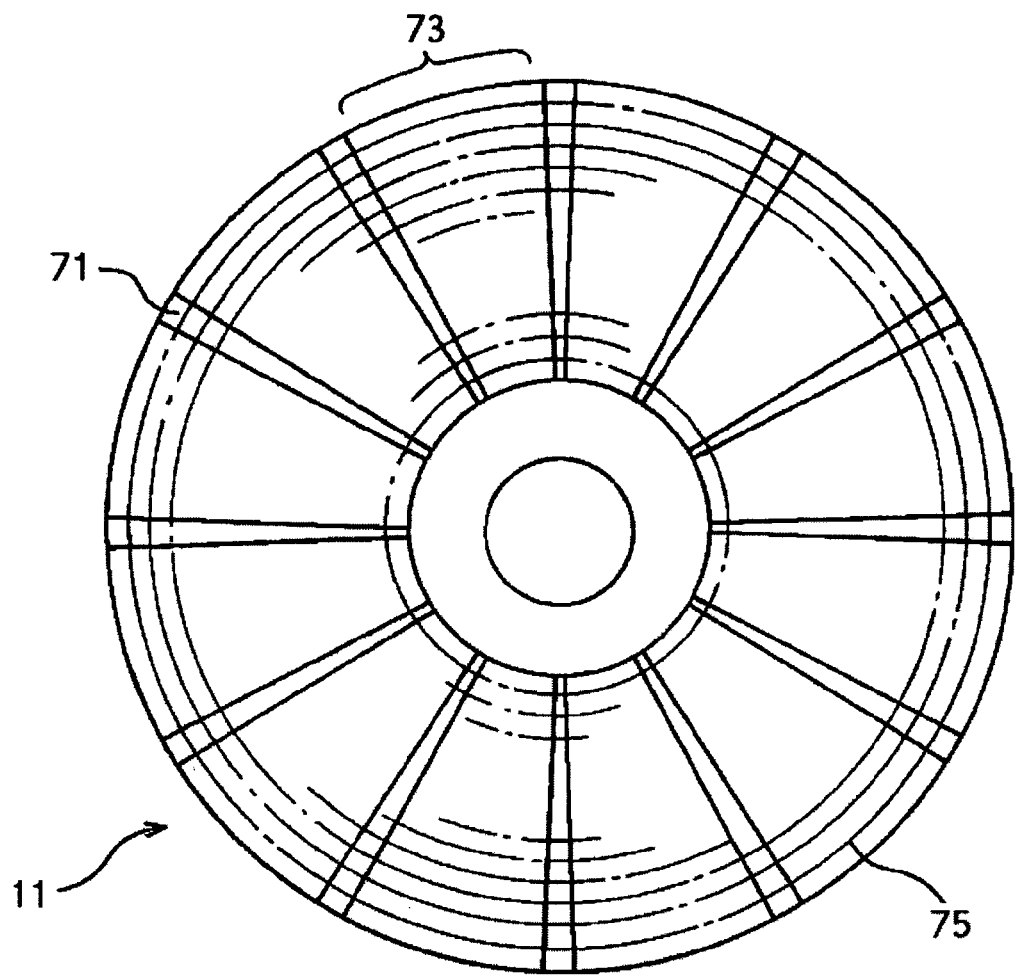
FIGS. 3(A) and 3(B) are diagrams for describing a configuration of sectors.
Figure 3:
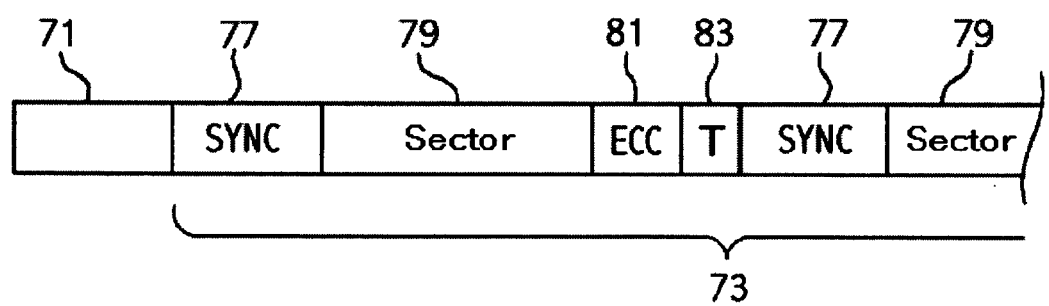

With reference to FIG. 2, a schematic configuration of a magnetic disk drive 10 according to an embodiment of the present invention will be described. Throughout this specification, like elements are designated by like reference numerals. A magnetic disk 11 as a magnetic recording medium is provided on both sides with recording surfaces, on each of which a magnetic layer is formed, and one or a plurality of laminated structures are attached to a spindle hub and rotated by a spindle motor 13. FIGS. 3(A) and 3(B) show a configuration of the recording surface on the magnetic disk 11. As shown in FIG. 3(A), a plurality of tracks 75 are defined concentrically on the recording surface of the magnetic disk 11. Further, a plurality of servo data 71 are recorded radially. As shown in FIG. 3(B), each track includes a data area 73 that is adjacent to the servo data 71 in the circumferential direction.

The data area 73 includes: SYNC patterns 77 each of which consists of 30 to 40 bytes for gain control and synchronization of read/write channels; sectors 79, each of which consists of 512 bytes and acts as a data recording area and a unit data area for read/write; and ECC codes 81, each of which consists of about 50 bytes for compensating for data reading errors. Further, the present embodiment employs time stamps 83, each of which consists of about 1 byte and is recorded between each ECC code 81 and each SYNC pattern 77 of each adjacent sector. A plurality of combinations of the SYNC pattern 77, the sector 79, the ECC code 81 and the time stamp 83 are formed in the data area 73. Each ECC code 81 includes a sector address of the corresponding sector.

A head 15 is comprised of separate conversion devices or a shared conversion device for read/write operations on the magnetic disk 11 by converting between electric and magnetic signals bidirectionally. An actuator assembly 17 holds the head 15 and rotates to transfer the head 15 onto a specified track of the magnetic disk 11. A voice coil motor (hereinafter referred to as the VCM) 19 is comprised of a voice coil mounted on the actuator assembly 17 and a voice coil magnet and a voice coil yoke each attached to a base of the magnetic disk drive 10. The motor controls movement of the actuator assembly 17 by feeding current through the voice coil. A VCM driver 21 converts voltage signals received from a digital-to-analog converter (hereinafter referred to as the DAC) 23 into driving current of the VCM 19. The DAC 23 receives digital signals for positioning the head 15 from a micro processing unit (hereinafter referred to as the MPU) 25 and converts the signals into analog voltage signals.

A spindle motor driver 27 comprises an AD converter to convert digital signals received from the MPU 25 into driving current for the spindle motor 13. A preamplifier 29 amplifies weak analog read signals that are read from the magnetic disk 11 by the head 15 during the read operation and sends the amplified signals to a read/write channel (hereinafter referred to as the R/W channel) 31. Also, the preamplifier 29 amplifies analog write signals that are received from the read/write channel 31 during the write operation and outputs the amplified signals to the head 15.

The R/W channel 31 performs data processing for the read or write operation. The R/W channel 31 receives write digital data sent from a host computer 55 through a hard disk controller (hereinafter referred to as the HDC) 33. The R/W channel 31 converts the received digital data into write current and sends the write current to the preamplifier 29. Further, the R/W channel 31 converts the read signals that are sent from the head 15 through the preamplifier 29 into digital data and sends the digital data to the host computer 55 via the HDC 33. A servo controller 37 extracts information about the position of the head from read data output from the R/W channel 31 and sends the information to the MPU 25 and the HDC 33.

The HDC 33 functions as an interface for communicating with the host computer 55 and adjusts between the data transfer rate with the host computer 55 and the data processing speed in the magnetic disk 10 accordingly. The HDC 33 stores the data transferred from the host computer 55 in a buffer 35 temporarily and sends it to the R/W channel 31 according to the commands from the MPU 25. Further, the HDC 33 stores the data transferred from the RIW channel 31 in the buffer 35 temporarily and sends it to the host computer 55 according to the commands from the MPU 25. Still further, the HDC 33 includes circuits utilizing the ECC code 81 such as a data error correction circuit and an address mark detection circuit. The HDC includes a register for performing data communication with the host computer 55.

The MPU 25 cooperates with the HDC 33 to control various components concerned with the operation of the magnetic disk drive 10. The MPU runs a refresh execution program to calculate an elapsed time after sector data is stored on the magnetic disk 11 till the sector data is read based on the time stamps of the relevant sector data stored in the sectors and the information about the time when the data is read and, then, to refresh the sector data or update the time stamps as needed. The MPU 25 runs the refresh execution program to send refresh request commands to the host computer and receive refresh commands from the host computer.

The MPU 25 accesses various registers of the HDC 33 directly to control the data transfer with the host computer 55. Also, the MPU 25 translates the cluster addresses of the magnetic disk 11 sent from the host computer 55 into LBA (linear block addressing) and, further, into CHS (cylinder/head/sector) parameters. Further, the MPU 25 refers to a relocation defect map (RDM) to calculate addresses of alternate sectors for secondary defective sectors. Still further, the MPU 25 determines the position of the magnetic head 15 based on servo information sent from the servo controller 37 and provides the digital-to-analog converter (hereinafter referred to as the DAC) 23 with digital signals for positioning the head 15 to a target position based on the difference from the target position that is calculated from the address specified by the host computer 55.

Read-only semiconductor memory (hereinafter referred to as the ROM) 41 stores the refresh execution program for allowing the MPU 25 to execute refresh. The refresh execution program may be stored in a system area of the magnetic disk 11 that is not open to the user. Random-access memory (hereinafter referred to as the RAM) 39 is a main storage device that stores various programs executed by the MPU 25 temporarily or acts as a work area of the MPU 25. While the magnetic disk drive operates, the RAM 39 stores a table for translating the cluster addresses to the CHS parameters and the RDM temporarily. Further, the RAM 39 acts as a buffer for storing the sector data that must be refreshed temporarily.

Electrically erasable programmable read-only memory (hereinafter referred to as the EEPROM) 43 stores information unique to the magnetic disk drive 10 such as a model name, a serial number, a firmware version, a protocol it uses and a manufacturer name, and set-up information such as power management, a write or pre-read cache and a read or write buffer. The EEPROM 43 may store the relocation defect map (RDM) that records entries for mapping the secondary defective sectors to the alternate sectors. Further, the EEPROM 43 can store data generated during operation of the magnetic disk drive 10, such as an error log, an event log, performance data, a servo log or a host log. However, in this embodiment, the RDM and the error log and other data are stored on the magnetic disk 11.

The host computer 55 is an electronic device to use the magnetic disk drive 10 as an external storage device or an auxiliary storage device. The host computer 55 is connected to an interface connector 47 according to any interface standard, such as ATA (AT Attachment) and SCSI (Small Computer System Interface) to transfer data with the magnetic disk drive 10. In this embodiment, the magnetic disk drive 10 adopts the ATA interface standard. Further, the host computer 55 issues the refresh commands to instruct the magnetic disk 11 to execute refresh. Still further, the host computer 55 refreshes the magnetic disk 11 based on the time stamps in a control table managed by a file management system of an operating system (hereinafter referred to as the OS).

Though an exemplary block diagram of the magnetic disk drive 10 according to an embodiment of the present invention has been shown hereinabove, it is to be appreciated that the designations, features, interrelationships of each block described with reference to the drawings are illustrative only and the spirit of the present invention is not limited to the shown example and, therefore, the addition of other features, the implementation of identical features by different blocks and the division or integration of the blocks may fall within the scope of the present invention so long as those skilled in the art can make such modification with reference to this specification.

Refresh with the Timing when a Read Command is Received

Figure 4:
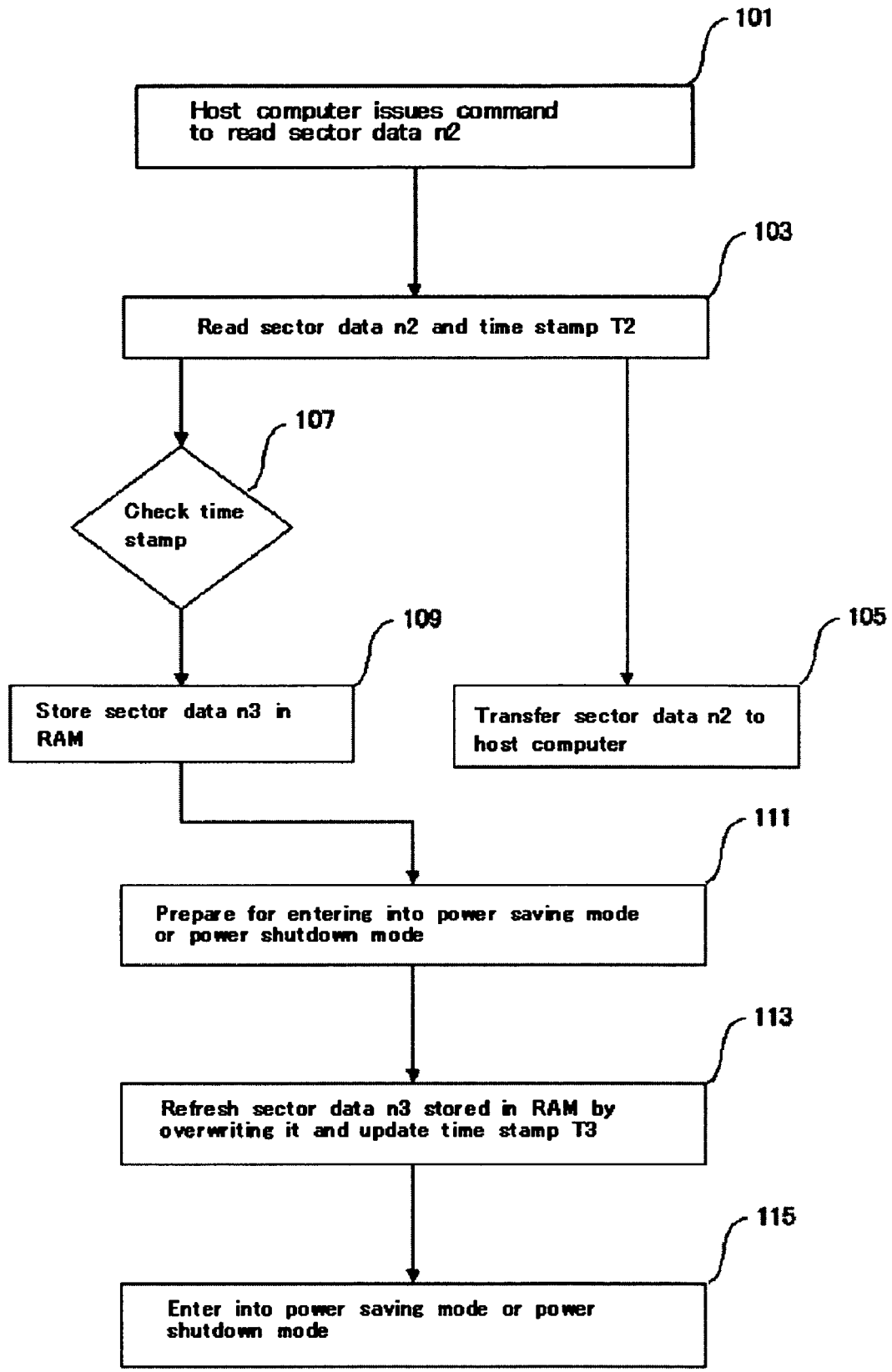
FIG. 4 is a flow chart for describing a method by which the magnetic disk drive refreshes sector data with the timing when a read command is received.

FIG. 4 is a flow chart for describing a method by which the magnetic disk drive 10 refreshes the sector data that is stored in the sector specified by a read command by checking a time stamp of the sector data with the timing when the read command is received from the host computer 55. The refresh of the sector data refers to a procedure to read the data stored in given sectors and, then, write the data into the identical sectors. The refresh procedure shown in FIG. 4 is described in the refresh execution program stored in the ROM 41. The refresh execution program is read out into the RAM 39 so that the MPU 25 can control the magnetic disk drive 10 and execute the program.

Sector data (hereinafter designated as n1) is stored in a plurality of sectors (hereinafter designated as S1) on the magnetic disk 11 at various time points. Each time stamp (hereinafter designated as T1) 83 provided in accordance with each sector data n1 consists of information about the date in year, month, and day or the date in year, month, and day with the addition of time of day when the sector data n1 is stored in the respective sector. Some of the sectors S1 do not have sector data n1 stored therein and the time stamps corresponding to such sectors S1 have an insignificant value. In block 101, the host computer specifies one or a plurality of sectors (hereinafter designated as S2) 79 among the sectors S1 and sends a data read command to the magnetic disk drive 10.

In block 103, the MPU 25 controls the magnetic disk drive 10 to access the sectors S2 and read the sector data (hereinafter designated as n2). Though the sectors S2 are typically a plurality of sectors included in a cluster, the present embodiment does not exclude the case of a single sector. The MPU 25 reads the sector data n2 from the rotating magnetic disk 11 and, subsequently, the time stamp (hereinafter designated as T2) 83 corresponding to the sector data n2. Since the sector data n2 and the time stamp T2 are disposed in physical proximity to each other on the magnetic disk 11 as shown in FIG. 3(B), the sector data n2 and the time stamp T2 can be read without rotational delay. The MPU 25 stores the read sector data n2 in the buffer 35 and prepares the sector data n2 to be returned to the host computer 55. Further, the MPU 25 stores the sector data n2 and the corresponding time stamp T2 as well as the sector address included in the ECC code 81 in the RAM 39. In the RAM 39, the sector data n2 may not be stored and only the time stamp T2 and the sector address may be stored.

In block 105, the MPU 25 returns the sector data n2 to the host computer 55. Since the return of the data to the host computer 55 is given a higher priority than the refresh, the refresh will not degrade the performance of the magnetic disk drive 10. In block 107, the MPU 25 calculates the elapsed time for each sector data n2 after it is stored till it is read based on the time stamp T2 and the information about the time when the sector data is read. The information about the time when the sector data is read includes the date in year, month and so on, which corresponds to the time stamp. The magnetic disk drive 10 may receive the information about the time when the sector data is read from the host computer 55 in a startup routine executed immediately after the host computer is turned on. Alternatively, the magnetic disk drive 10 may be provided with a clock connected with a rechargeable battery to obtain the information by measurement.

The refresh execution program includes a standard elapsed time for determining the refresh timing. The standard elapsed time is a time limit during which the data stored on the magnetic disk 11 can be read properly and is set to, for example, three or five years, which may vary depending on an assumed environmental temperature value provided to the magnetic disk 11, selected recording media and the like. The host computer 55 may be configured to write the standard elapsed time into the EEPROM 43 to which the refresh execution program refers.

In block 109, the MPU 25 determines the elapsed time of each sector data by subtracting the read time stamp T2 from the information about the present time and, if any sector data exceeding the standard elapsed time (hereinafter designated as n3) is found, the MPU 25 keeps such sector data n3 with the corresponding sector addresses in the RAM 39 and deletes other sector data from the RAM 39. Also when the host computer 55 issues other read commands, the MPU 25 operates similarly to cumulatively store the sector data n3 having an actual elapsed time exceeding the standard elapsed time with the corresponding sector addresses.

In block 111, the magnetic disk drive 10 begins preparation for entering into a power saving mode or a power shutdown mode. In the power saving mode, electric power is saved, for example, by turning off the spindle motor or a portion of the circuit board when the host computer 55 does not access the magnetic disk drive 10 for a predetermined time period. The power saving mode has several steps of the range to be turned off, but the magnetic disk drive 10 can always receive the command from the host computer 55 to start its operation even with the maximum power saving. On the other hand, in the power shutdown mode, after receiving a stop command from the host computer 55, the magnetic disk drive returns the command to indicate that it can be stopped and, then, turns the power off completely.

In block 113, if the MPU 25 determines to move into the power saving mode or receives the stop command from the host computer 55, the MPU 25 refreshes the sector data n3 by writing the sector data n3 stored in the RAM 39 into the sectors S3, from which the sector data n3 has been read originally. Further, the time stamp T3 of the sectors S3 is updated with the information about the refresh time. If the sector data n2 that has been read in block 103 is not stored in the RAM 39, the MPU 25 refreshes the sector data by reading out the sector data n3 from the magnetic disk 11. After the sector data is refreshed and the time stamp is updated, the magnetic disk drive 10 moves into the power saving mode in block 115. In the case of the power shutdown mode, the magnetic disk drive 10 sends a command to indicate that it can be stopped and the host computer turns off the power supplied to the magnetic disk drive 10 in response to the command.

In the procedure described above, as the magnetic disk drive 10 checks the time stamp T2 of the sector data n2 to be read with the timing when it receives the read command from the host computer 55 and refreshes the sector data n3 that exceeds the standard elapsed time, the magnetic disk drive 10 hardly wastes the time for refresh uselessly and, therefore, the performance of the magnetic disk drive 10 will not be degraded. One time stamp occupies only about 1 byte in each sector of 512 bytes and, therefore, the reduction of storage capacity of the magnetic disk 11 due to the use of the time stamp is almost negligible. The time stamps 83, which are stored adjacently to the corresponding ECC codes 81 on the magnetic disk 11, do not cause rotational delay for reading. As the ECC codes 81 are calculated logically to be written every time the sector data is stored, the time stamps 83 may be incorporated into the ECC codes 81. If the time stamps 83 are incorporated into the ECC codes 81, the magnetic disk 11 does not have to be provided with the extra area to store the time stamps.

Figure 5:
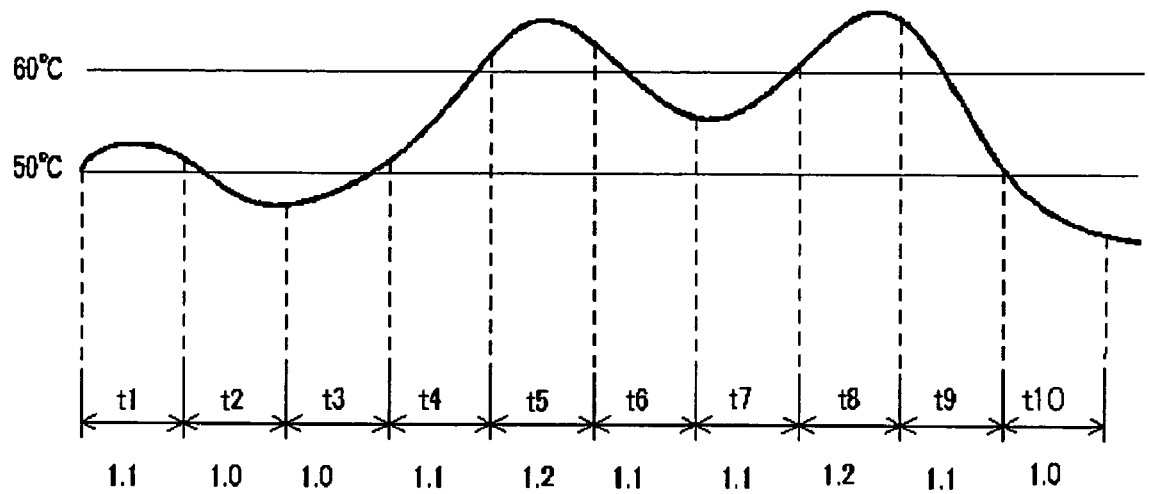
FIG. 5 is a diagram for describing a method for correcting elapsed time for temperature.

FIG. 5 is a diagram showing an example of temperature correction of the elapsed time. The degree of degradation of the data stored on the magnetic disk 11 due to thermal decay depends not only on the elapsed time, which is a simple temporal factor, but also on the temperature profile, to which the magnetic disk 11 is exposed during the elapsed time. Therefore, the period when the refresh is needed can be determined more properly by correcting the elapsed time for the temperature profile. In FIG. 5, two reference temperature values of 50° C. and 60° C. are set and the elapsed time is divided into t1 to t10 evenly. The average ambient temperature of the magnetic disk drive in each period t1 to t10 is measured and, then, the temperature coefficient for the actual elapsed time is determined to be 1.0 if the average ambient temperature is less than 50° C., the temperature coefficient is determined to be 1.1 if the average ambient temperature is between 50° C. and 60° C., or the temperature coefficient is determined to be 1.2 if the average ambient temperature is more than 60° C., and, then, the actual elapsed time is multiplied by the appropriate coefficient.

Thus, the information about the present time is corrected by multiplying the actual elapsed time by the temperature coefficients so that the elapsed time after each sector data has been recorded till the present can be corrected by the temperature profile and, therefore, the accuracy to determine the refresh timing in consideration of the thermal decay can be improved. The temperature coefficient for each period t1 to t10 is measured and calculated by the host computer 55 and sent to the magnetic disk drive 10 in the startup routine of the host computer 55. The host computer 55 is provided with a temperature measurement system including a rechargeable battery so as to measure the ambient temperature of the magnetic disk drive 10 while the power is turned off. Because of the fact that the elapsed time is divided evenly, no matter when the sector data is written, the corrected elapsed time can be calculated by multiplying the evenly divided elapsed time after the sector data is written by the temperature coefficient.

Refresh with the Timing when a Refresh Command is Received

Next, a method for refreshing sector data by receiving a refresh command from the host computer 55 will be described. By designing the magnetic disk drive 10 on the precondition that the sector data is refreshed within a predetermined period, the grain size of the magnetic disk 11 can be reduced and, as a result, the SN ratio can be improved.

In the refresh method that has been described with reference to the flow chart of FIG. 4, the elapsed time is calculated only for sector data in the sectors that are read by the host computer and only the sector data exceeding the standard elapsed time is refreshed. Thus, there is a possibility that the sector data stored in the sectors that are not read by the host computer 55 within a predetermined time interval may not be refreshed and, as a result, become unreadable. Therefore, it is effective to check the time stamps of all the sector data every predetermined period, for example, one year and refresh the sector data exceeding the standard elapsed time.

Figure 6:
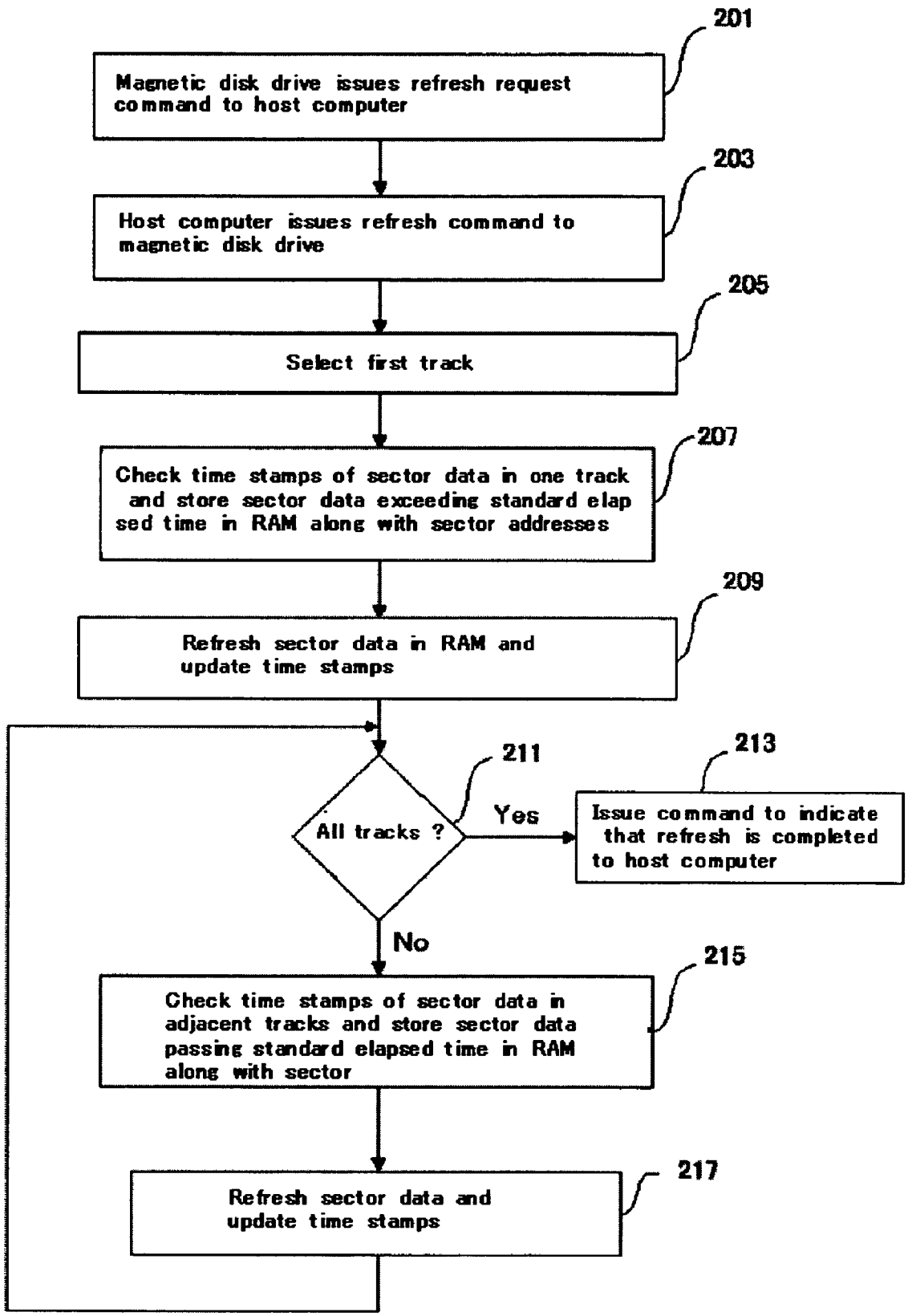
FIG. 6 is a flow chart for describing a method by which the magnetic disk drive receives a refresh command from a host computer and, then, refreshes sector data.

FIG. 6 is a flow chart for describing an exemplary method by which the magnetic disk drive receives a refresh command from the host computer 55 and refreshes the sector data. The refresh procedure shown in FIG. 6 is described in the refresh execution program stored in the ROM 41 and the refresh execution program is read out into the RAM 39 so that the MPU 25 can control the magnetic disk drive 10 and execute the program.

In block 201, the magnetic disk drive 10 measures information about the present time by itself or receives the information from the host computer 55 to determine the timing to check whether the sector data must be refreshed and, then, sends a refresh request command to the host computer 55. The refresh timing may be determined not by the magnetic disk drive 10 but by the host computer 55. In block 203, when the user who is observing the operating condition of the host computer 55 determines that the refresh may be performed, the host computer 55 sends a refresh command to the magnetic disk drive 10.

As the host computer 55 cannot access the magnetic disk drive 10 when the magnetic disk drive 10 performs refresh according to this embodiment, it is desirable that the refresh command is sent by the user based on the usage of the host computer 55, but the host computer 55 may send the refresh command by automatically responding to the refresh request command received from the magnetic disk drive 10. In this embodiment, the magnetic disk drive 10 checks the time stamps T1 of all the sector data S1 and refreshes the sector data as required. Alternatively, the magnetic disk drive 10 may check not all the sector data but the sector data in the sectors in the user area that is open to the user. Further, the refresh timing of the system program and data of the magnetic disk drive 10, which is stored in the system area the user cannot access, may be determined separately.

In block 205, a first track TR1 for checking the time stamps is selected. The track is desirably selected so that seek operations and rotational delay may not occur or, for example, the first track in the outermost cylinder is selected first and, then, the second track in the same cylinder is selected and, after the time stamps of all tracks in the same cylinder are checked, the tracks in the next cylinder are checked.

In block 207, the time stamps T2 of all the sector data S2 contained in the selected track TR1 are checked while TR1 is rotated one revolution and, then, the elapsed time is calculated from the information about the present time so that the sector data n3 exceeding the standard elapsed time is stored in the RAM 39 along with the corresponding sector addresses. In block 209, the sector data n3 that is stored in the RAM 39 to be refreshed is written into the corresponding sectors S3 during the next revolution and, further, the time stamps T3 of the sector data n3 are updated with the information about the present time. In block 211, it is determined whether the time stamps in all the tracks have been checked and the sector data has been refreshed as necessary. If the check and refresh is completed, the process proceeds to block 213, where the MPU 25 sends a command to indicate that the refresh is completed to the host computer 55. It allows the host computer 55 to access the magnetic disk drive 10.

If the time stamps in any track are not checked yet in block 211, the process proceeds to block 215, where the track TRX is selected and the procedure similar to that in block 207 is executed. Then, in block 217, the procedure similar to that in block 209 is executed. As described above, the time stamps of all the sector data in the adjacent cylinders can be checked and the sector data reaching the refresh timing can be refreshed. As this refresh procedure can assure the cycle to refresh the stored sector data, magnetic disks having grains with an improved SN ratio can be used and, as a result, the design freedom of the magnetic disk drive can be increased.

Though the magnetic disk drive 10 checks the time stamps in response to the refresh command so as to determine the sector data that must be refreshed and perform the refresh, the refresh may be performed at the same time when the host computer performs read check of the entire magnetic disk 11. For example, Windows (Windows is a registered trademark of Microsoft Corporation) is standardly equipped with a maintenance tool for data read check called ScanDisk. The refresh can be completed substantially within the time period required for ScanDisk by reading the time stamps of all the sector data and performing the necessary refresh simultaneously with ScanDisk.

Refresh Performed by the Host Computer

Figure 8:
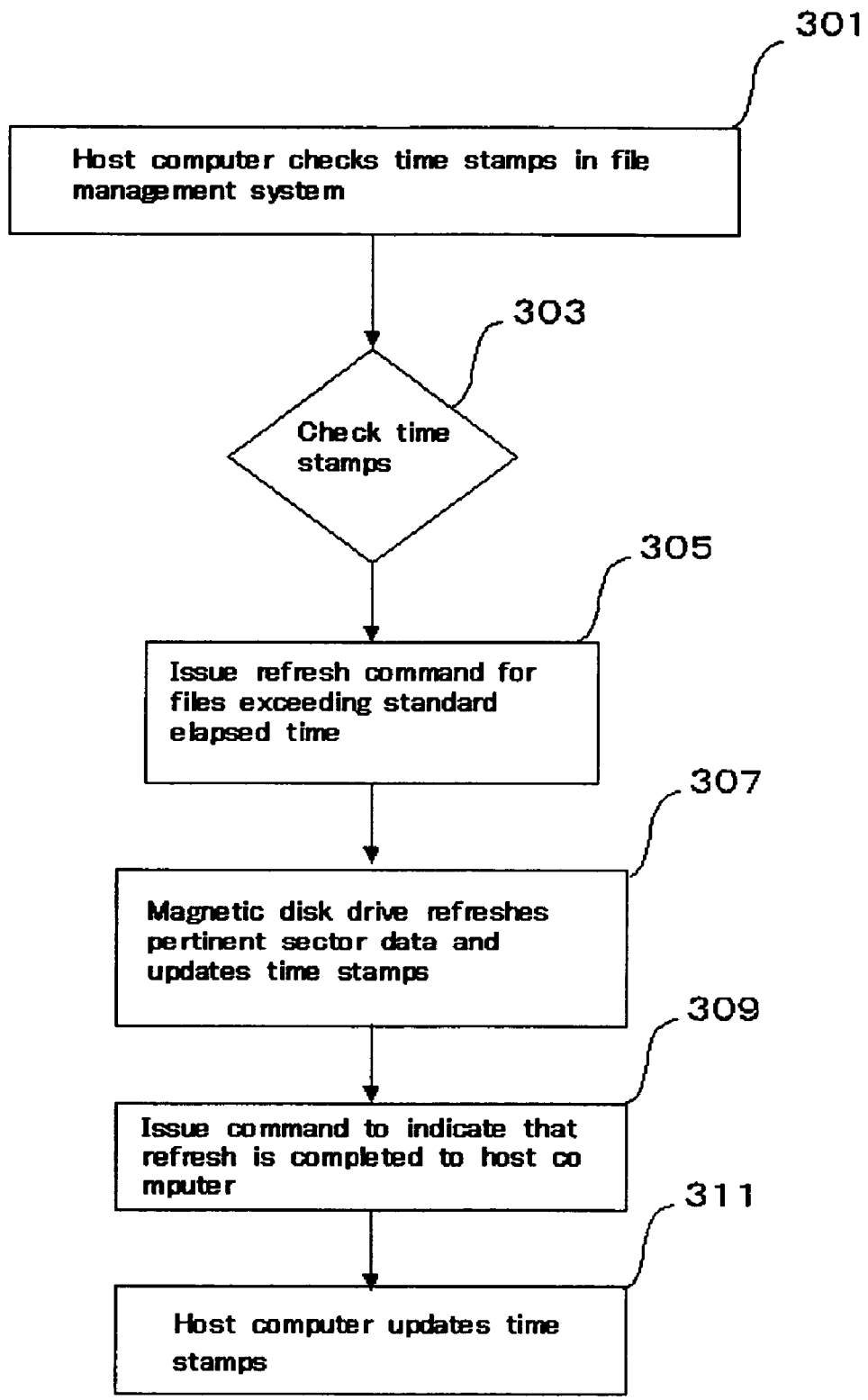
FIG. 8 is a flow chart for describing a method by which the host computer refreshes sector data.

Next, a method by which the host computer calculates the elapsed time of each sector and executes the refresh of the magnetic disk drive 10 will be described with reference to FIGS. 7 and 8. FIG. 7 is a diagram for describing a file control table of the host computer. FIG. 8 is an exemplary flow chart for describing a method by which the host computer refreshes the sector data. Basic operations of the host computer 55 such as a personal computer are controlled by an OS. When an external storage device such as the magnetic disk drive is connected to the host computer 55 for reading/writing data, the host computer 55 manages file locations by a file management system.

FIG. 7 is a file control table called a directory, which is used in the file management system of MS-DOS. In the directory, file names, extensions, attributes, reserved areas, write dates, starting clusters and file sizes of each file are stored. For example, it is indicated that a file ABC is written on 21:41:30 Oct. 15, 2001. This write date corresponds to the time stamp according to the present embodiment. The location where the file ABC is stored on the magnetic disk 11 is identified by the address of the starting cluster. The cluster is a minimum unit for which the host computer 55 handles files in the magnetic disk drive 10 and consists of a plurality of sectors.

The information about which clusters should be used is stored in a table called FAT (file allocation table). As an address of a cluster chain following the starting cluster address 5 of the file ABC is stored in FAT, the location of the file ABC on the magnetic disk 11 can be identified as the cluster address. Therefore, the host computer 55 can know when each file has been written by checking the directory.

The host computer is a known general purpose computer comprising a CPU, a RAM, a ROM, an IDE controller and the like. The CPU controls entire operations. The RAM temporarily stores programs executed by the CPU or acts as a work area for the CPU. The ROM stores a BIOS and the like. The IDE controller acts an interface with the magnetic disk drive 10. The refresh execution program for executing the procedure in FIG. 8 is read out from the magnetic disk drive 10 into the RAM of the host computer so that it can be executed. In block 301 of FIG. 8, the host computer 55 checks the time stamps written in the directory of the file management system. The refresh execution program is configured so that the host computer 55 reads the time stamps in the directory at a regular interval such as every one or two years.

In block 303, the host computer 55 selects the files exceeding the standard elapsed time based on the information about the present time and time stamps of each file. In block 305, the host computer 55 sends a refresh command for refreshing the files exceeding the standard elapsed time to the magnetic disk drive 10 along with the cluster addresses of the target files. In block 307, the magnetic disk drive 10, receiving the refresh command, refreshes the sector data in the sectors where the target files are stored and updates the time stamps. In block 309, the magnetic disk drive 10 sends a refresh completion command to the host computer 55 and, in block 311, the host computer 55 updates the time stamp of the directory.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive for communicating with a host computer, the magnetic disk drive comprising:
   a magnetic disk having a storage area divided into a plurality of sectors, each sector capable of storing sector data;
   a time stamp recording medium configured to store time stamps, each time stamp corresponding to sector data; and
   a processor configured to control components of said magnetic disk drive to read the time stamps and refresh selected sector data, wherein each selected sector data is selected based on a time stamp and information about a time when the time stamp is read,
   wherein addresses of said selected sector data are stored in nonvolatile memory and said selected sector data is refreshed in a power saving mode or a power shutdown mode of said magnetic disk drive.

2. A magnetic disk drive according to claim 1, wherein said sector data, the time stamps of which are read, is sector data instructed to be read by said host computer.

3. A magnetic disk drive according to claim 2, wherein said processor sends said sector data instructed to be read to said host computer before refreshing said selected sector data.

4. A magnetic disk drive according to claim 1, wherein said processor updates the time stamps of said refreshed sector data with information about the time corresponding to the refresh timing.

5. A magnetic disk drive according to claim 1, wherein said magnetic disk comprises said time stamp recording medium.

6. A magnetic disk drive according to claim 5, wherein areas for storing said time stamps are provided at positions of each sector of said magnetic disk.

7. A magnetic disk drive according to claim 6, wherein said time stamps are incorporated into ECC codes.

8. A magnetic disk drive according to claim 1, wherein said information about the time when the time stamps are read is corrected for an ambient temperature profile of said magnetic disk drive that is measured after said sector data, the time stamps of which are read, is stored and before said time stamps are read.

9. A magnetic disk drive according to claim 8, wherein said magnetic disk drive receives the information about the time corrected for said ambient temperature profile from said host computer.

10. A magnetic disk drive that can communicate with a host computer, the magnetic disk drive comprising:
a magnetic disk having a storage area divided into a plurality of sectors;
a time stamp recording medium configured to store time stamps that correspond to each sector data stored in said plurality of sectors; and
a processor configured to control components of said magnetic disk drive by responding to a refresh command sent from said host computer to read time stamps of sectors specified by said refresh command and configured to refresh selected sector data based on one or more elapsed times of the sector data that are calculated from information about a time when the time stamps are read and said time stamps,
wherein said refresh command includes a command to perform a read check of all sector data written on said magnetic disk.

11. A magnetic disk drive according to claim 10, wherein the sectors specified by said host computer are sectors on said magnetic disk.

12. A magnetic disk drive according to claim 10, wherein said processor sends a refresh request command to said host computer.

13. A host computer that is connected to a magnetic disk drive that, in turn, comprises a magnetic disk having a storage area divided into a plurality of sectors, the host computer comprising:
a processor configured to control operations of said host computer;
a file control table to hold time stamps corresponding to sector data stored in each sector in said magnetic disk drive; and
a recording medium configured to store a refresh program to allow said processor to perform a refresh of sector data selected based on an elapsed time of the sector data that is calculated from a time stamp stored in said file control table and information about the present time.

14. A host computer according to claim 13, wherein said sector data is refreshed for each cluster including plural sectors.

15. A refresh method for refreshing sector data stored in a plurality of sectors of a magnetic disk in a magnetic disk drive that is configured to communicate with a host computer, the refresh method comprising:
receiving a refresh command from said host computer;
reading time stamps corresponding to sector data;
calculating one or more elapsed times of the sector data from information about when the time stamps are read and said time stamps;
selecting sector data to be refreshed in response to said step of calculating the elapsed times of the sector data; and
refreshing said selected sector data,
wherein said refresh command includes a command to perform read check of all sector data written on said magnetic disk.

16. A refresh method for refreshing sector data stored in a plurality of sectors provided on a magnetic disk of a magnetic disk drive, the refresh method comprising:
storing time stamps, each time stamp corresponding to sector data;
reading said time stamps;
calculating one or more elapsed times of said feed sector data from said read time stamps and information about a time when the time stamps are read;
correcting said elapsed times with an ambient temperature profile of said magnetic disk drive that is measured after said sector data is stored and before said time stamps are read;
selecting sector data to be refreshed in response to said step of calculating the elapsed times of said sector data; and refreshing said selected sector data.

17. A refresh method according to claim 16, wherein reading the time stamps includes reading the time stamps of all sector data.

18. A refresh method according to claim 16, wherein correcting said elapsed times includes multiplying a coefficient with an elapsed time, and wherein said coefficient is determined by the ambient temperature profile.

19. A refresh method according to claim 18, wherein an elapsed time is composed of a plurality of periods, each period having a coefficient.

20. A refresh method according to claim 19, wherein the ambient temperature profile is separated into two or more regions based on temperature values, and wherein a first coefficient for a first period has a larger value than a second coefficient for a second period when the first period has an average temperature within a region of higher temperature region than the second period.

* * * * *